US011724843B2

(12) United States Patent
Kalany et al.

(10) Patent No.: US 11,724,843 B2
(45) Date of Patent: Aug. 15, 2023

(54) APPARATUS AND METHODS FOR TRANSFERRING CONTINUOUSLY MOVING ARTICLES TO CONTINUOUSLY MOVING PACKAGES WITH INTERVENING ARTICLE GROUPING AND GROUP PITCH ADJUSTMENT

(71) Applicant: R.A Jones & Co., Covington, KY (US)

(72) Inventors: Robert M. Kalany, Florence, KY (US); Anthony B. Salvato, Cincinnati, OH (US); Matthew R. Lukes, Edgewood, KY (US); Jerome Brugger, Melbourne, KY (US)

(73) Assignee: R.A Jones & Co., Covington, KY (US)

( * ) Notice: Subject to any disclaimer, the term of this patent is extended or adjusted under 35 U.S.C. 154(b) by 0 days.

(21) Appl. No.: 17/227,731

(22) Filed: Apr. 12, 2021

(65) Prior Publication Data

US 2021/0229847 A1 Jul. 29, 2021

Related U.S. Application Data

(62) Division of application No. 15/341,462, filed on Nov. 2, 2016, now Pat. No. 11,001,400.
(Continued)

(51) Int. Cl.
*B65B 35/36* (2006.01)
*B65G 47/91* (2006.01)
(Continued)

(52) U.S. Cl.
CPC ............ *B65B 35/36* (2013.01); *B25J 9/0093* (2013.01); *B25J 9/1687* (2013.01);
(Continued)

(58) Field of Classification Search
CPC ......... B65B 35/58; B65B 35/38; B65B 35/36; B65B 57/14; B65B 57/10; B65B 5/105;
(Continued)

(56) References Cited

U.S. PATENT DOCUMENTS

| 3,934,920 A | 1/1976 | Rowekamp |
| 6,352,402 B1 | 3/2002 | Hwang et al. |

(Continued)

FOREIGN PATENT DOCUMENTS

| DE | 102009022820 A1 | 12/2010 |
| DE | 202010001712 U1 | 6/2011 |

(Continued)

OTHER PUBLICATIONS

International Searching Authority, Search Report and Written Opinion Issue in Corresponding International Application No. PCT/US2017/0103345 dated May 10, 2017, 14 pages.
(Continued)

*Primary Examiner* — Thomas M Wittenschlaeger
(74) *Attorney, Agent, or Firm* — Wood Herron & Evans LLP

(57) ABSTRACT

Packaging apparatus and methods include a plurality of article grippers driven by independently controlled motors in an end-of-arm tooling (EOAT), for picking articles, grouping articles, adjusting group pitch and placing article groups in packages where incoming articles and packages are continuously or intermittently moving and without motion of the entire EOAT in the direction in which articles and packages are picked and moved. Hole healing and incoming product registration apparatus and methods are disclosed.

18 Claims, 12 Drawing Sheets

Related U.S. Application Data

(60) Provisional application No. 62/280,901, filed on Jan. 20, 2016.

(51) Int. Cl.
| | |
|---|---|
| *B65B 35/38* | (2006.01) |
| *B65B 57/14* | (2006.01) |
| *B25J 9/00* | (2006.01) |
| *B25J 15/00* | (2006.01) |
| *B65B 21/18* | (2006.01) |
| *B65B 21/20* | (2006.01) |
| *B65G 47/90* | (2006.01) |
| *B65B 57/10* | (2006.01) |
| *B25J 9/16* | (2006.01) |
| *B65B 5/06* | (2006.01) |
| *B65B 5/10* | (2006.01) |
| *B65B 35/58* | (2006.01) |
| *B65B 43/42* | (2006.01) |
| *B65B 65/02* | (2006.01) |

(52) U.S. Cl.
CPC ............ *B25J 15/0061* (2013.01); *B65B 5/06* (2013.01); *B65B 5/105* (2013.01); *B65B 21/18* (2013.01); *B65B 21/20* (2013.01); *B65B 35/38* (2013.01); *B65B 35/58* (2013.01); *B65B 43/42* (2013.01); *B65B 57/10* (2013.01); *B65B 57/14* (2013.01); *B65G 47/905* (2013.01); *B65G 47/907* (2013.01); *B65G 47/918* (2013.01); *B65B 65/02* (2013.01); *B65B 2220/18* (2013.01)

(58) Field of Classification Search
CPC ........... B65B 5/06; B65B 21/18; B65B 21/20; B65B 2220/18; B65B 43/42; B65B 65/02; B25J 9/1687; B25J 9/0093; B25J 15/0061; B65G 47/907; B65G 47/918; B65G 47/905
See application file for complete search history.

(56) References Cited

U.S. PATENT DOCUMENTS

| | | |
|---|---|---|
| 6,439,631 B1 | 8/2002 | Kress |
| 7,661,249 B2 | 2/2010 | Monti |
| 8,671,651 B2 | 3/2014 | Poutot |
| 8,776,984 B2 | 7/2014 | Monti |
| 8,777,552 B2* | 7/2014 | Ward ................. B65G 57/00 414/736 |
| 9,957,117 B2 | 5/2018 | Alberti et al. |
| 9,969,565 B1 | 5/2018 | Simm |
| 10,213,884 B2 | 2/2019 | Kogushi |
| 10,322,833 B2 | 6/2019 | Hutter et al. |
| 2008/0000756 A1* | 1/2008 | Behnke ............... B65G 47/918 198/468.4 |
| 2011/0154784 A1* | 6/2011 | Poutot ................ B65B 43/285 53/247 |
| 2011/0173930 A1 | 7/2011 | Poutot |
| 2012/0039699 A1* | 2/2012 | Ward .................. B65G 57/26 414/590 |
| 2013/0017052 A1 | 1/2013 | Dorner |
| 2013/0115033 A1 | 5/2013 | Lukes et al. |
| 2014/0119875 A1 | 5/2014 | Job et al. |
| 2014/0377049 A1 | 12/2014 | Girtman |
| 2015/0063963 A1* | 3/2015 | Kinugawa ........... B25J 15/0052 414/561 |
| 2015/0158611 A1 | 6/2015 | Kalany et al. |
| 2016/0176560 A1 | 6/2016 | Aumann et al. |
| 2017/0036794 A1* | 2/2017 | Sassi ..................... B65B 5/105 |
| 2017/0057675 A1 | 3/2017 | Woehl |
| 2017/0291307 A1 | 10/2017 | Davi et al. |

FOREIGN PATENT DOCUMENTS

| | | |
|---|---|---|
| EP | 0644120 A1 | 3/1995 |
| EP | 2192063 A1 | 6/2010 |
| WO | 2006015657 A1 | 2/2006 |

OTHER PUBLICATIONS

Canadian Intellectual Property Office, Office Action, Application No. 3,011,690, dated Jan. 20, 2023 (6 pages).

* cited by examiner

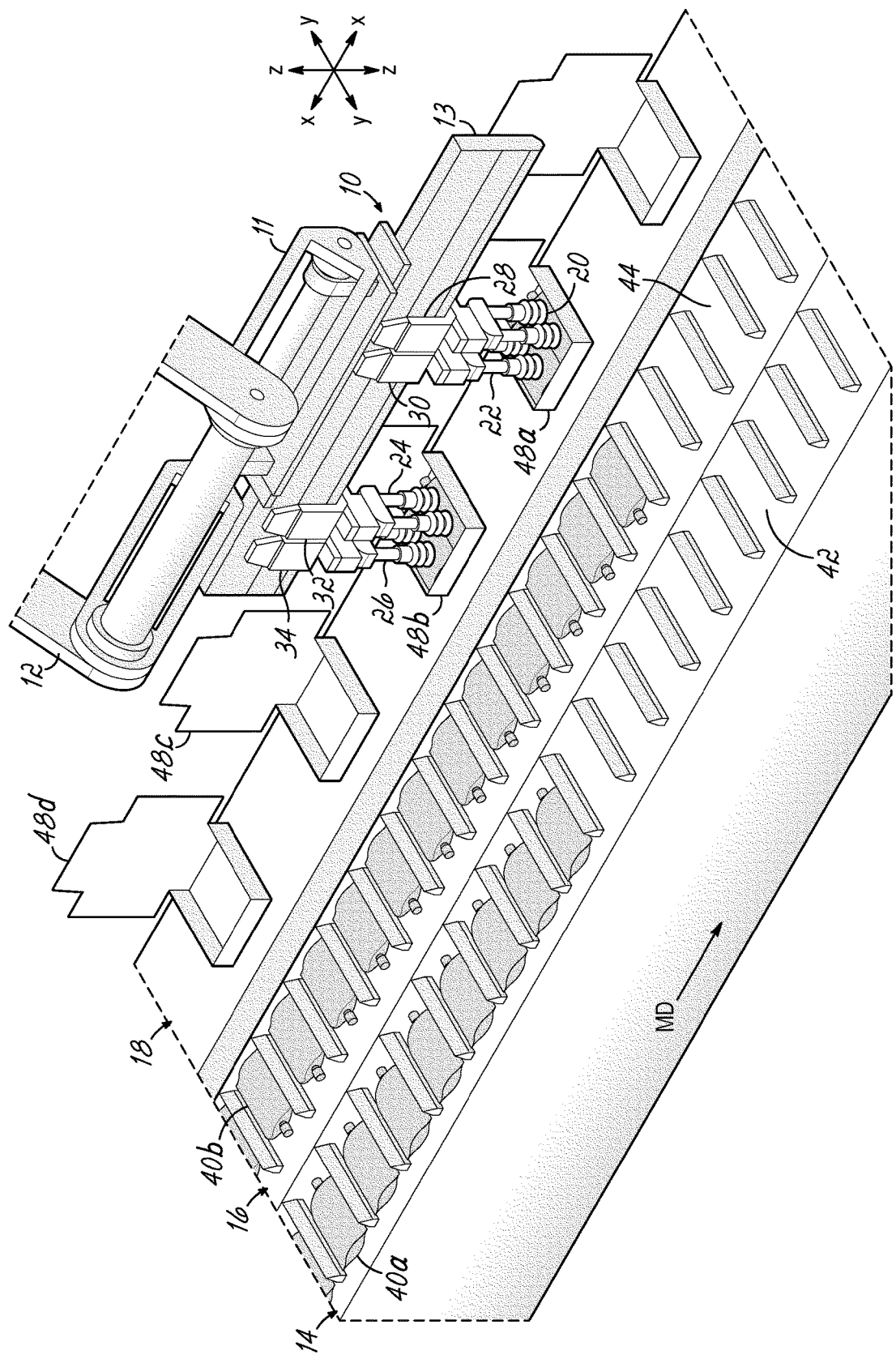

APPARATUS AND METHODS FOR TRANSFERRING CONTINUOUSLY MOVING ARTICLES TO CONTINUOUSLY MOVING PACKAGES WITH INTERVENING ARTICLE GROUPING AND GROUP PITCH ADJUSTMENT

PRIORITY CLAIM

The present application is a Divisional application of co-pending U.S. Ser. No. 15/341,462, filed Nov. 2, 2016, which priority is claimed of the filing date of Jan. 20, 2016 of U.S. Provisional patent application, Ser. No. 62/280,901, which is expressly incorporated herein by these references.

FIELD OF THE INVENTION

This invention relates to apparatus and methods for material handling and more particularly to end-of-arm tooling (EOAT) for picking articles from a supply stream, grouping articles, adjusting pitch of article groups and placing pitch-adjusted article groups into containers or packages, such as a cartons whose pitch is matched to the pitch adjusted article groups.

BACKGROUND OF THE INVENTION

In packaging equipment, it is common and necessary to create groups of articles, such as pouches or other items. The grouped items are subsequently transferred into packaging containers or cartons, where the pitch of the grouped items is indexed to the pitch of the cartons. It is typical to supply articles on a supply conveyor in an orderly manner with articles at a common pitch. Cartons travel on a carton conveyor along a path similar to the articles at a common fixed pitch. Where supply and carton conveyors are intermittently operated, the pick and place operations can be accomplished by a robot driving an end-of-arm tool in two axes or directions. As the rate at which articles are produced increases, however, it is often beneficial to operate both the supply conveyor and the carton conveyor in a continuous manner, particularly for desirable throughput without intermittent operation. In this case of continuous operation, the article pick operation from the supply conveyor and then placement of articles into cartons operations will require that the product transfer have the ability to track the motion of the supply and carton conveyors in a third axis or in a machine direction.

Since group patterns are often changed to provide a variety of different packages, it is necessary that the end-of-arm tooling (herein the "EOAT") be adjustable or changeable. This adjustability often requires either manual adjustment procedures or that EOAT mechanical assemblies be wholly replaced. Moreover, to accommodate continuous motion, the robot must move the EOAT in three axes of motion: vertical, horizontal and "X-axis" or motion in the machine or conveyor direction.

Several prior methods of packaging are known. One such method uses a fixed cam to adjust the individual article grippers from the article supply conveyor pitch to the package group configuration and group pitch indexed to the receiving carton pitch. Tracking is achieved by utilizing a robotic arm that can be programmed to move vertically, in the cross machine direction and in the machine direction. With these three degrees of motion, the picking, placing and tracking are achieved. Pitch and grouping changes, however, for varying packaging parameters, require manual adjustments and/or whole replacement assemblies as noted above.

Another concern with prior article transfers for packaging machines, has long been to address missing articles in the supply feed, and in formed or forming article groups, the article missing positions sometimes referred to as "holes" in the article lineup. For example, where articles are typically introduced to an article grouping station at a constant article pitch or spacing between article positions, it is not unusual to experience a vacant pitch or space where, although expected, no article exists. This can be caused by a number of supply or feeding operations or aberrations.

Thus where the article grouping apparatus functions to transfer a preferred number group or pattern of articles in a process where the articles are to be grouped for packaging, an article vacancy or holes, i.e. a missing article, results in a group of less than a full number or complement of articles. Such an incomplete group constituting less than a desired pattern, results in general additional or undesirable solutions, including but not limited to scrapping the incomplete group, collecting an incomplete group to make up for subsequent "holes" in other groups, or hand feeding of missing articles into a group.

Each of these solutions to the article hole problem is accompanied by undesirable results such as increased cost, reduction of throughput rate, additional apparatus, personal cost or the like.

Another concern with prior article feeds is that when articles are supplied on a conveyor, or in trays, or between lugs of a conveyor, the exact position of the articles in such conveyors or in trays or between lugs is not exact. Thus when articles are picked up by article grippers, the orientation of the articles on the grippers, and when placed by the grippers is not exactly repeatable, leading to mis-oriented articles in a final container.

Accordingly, it has been one objective of the invention to provide apparatus and method for article picking, article group forming, article group pitching and article group transfer and placing of articles from an article supply conveyor into containers, packages or cartons on a carton supply conveyor, and having the capacity to provide a variety of grouping and group pitching operations without a robot moving an EOAT as a whole in an "X-axis" or machine direction.

It is a further objective of the invention to provide apparatus and methods for transferring articles at one pitch from a supply conveyor to cartons at another pitch on a carton conveyor without requiring an entire EOAT moving in a machine direction and while, however, providing a variety of easily adjustable picking, grouping, group pitching and placing operations. It has thus been another objective of this invention to provide apparatus and methods for automatically healing holes or article vacancies otherwise appearing in an article group form in a transfer station.

A further objective of the invention has been to accurately register article position in an article feed or supply so final article placement is repeatedly accurate.

SUMMARY OF THE INVENTION

To these ends and in addition to yet other objectives, the invention in a preferred embodiment contemplates an EOAT having as a component thereof a number of independent article grippers movable with respect to the other EOAT components in an x-axis or machine direction. In a preferred embodiment there is thus provided a transfer system where the picking and grouping functions utilize a moving magnet linear motor system with multiple moving elements to move the individual grippers, mounted on and carried as part of a two-axis moveable EOAT. The independent movement of the grippers on the EOAT facilitates matching the pitch of the product on the supply conveyor for article picking, as well as providing a means for grouping the articles or products to match the group pattern and pitch of the desired moving cartons or packages. Since the movement of the grippers is accomplished by programming the linear motor control, changing group patterns is quick and repeatable without the need to replace costly tooling, without the need for manual equipment adjustment, and without the requirement of the whole or entire EOAT being moveable in a "X-axis" or machine direction. Also, since the moving elements are thus programmable, it is possible that the linear motor system also manages the tracking function for article picking, grouping, group pitching and group placing, thus reducing the cost of the robotic arm carrying the EOAT and eliminating the need for wholesale replacement or manual adjustment of the EOAT. In this invention, the robotic arm carrying the EOAT need only move in two directions, vertically and in the cross machine direction, but not in the machine direction.

The invention in one embodiment thus provides apparatus and methods for:
tracking articles in a common pitch in a continuously moving article supply or first path in a machine direction or parallel thereto;
picking articles from the supply path;
grouping the picked articles;
tracking containers, and container pitch in a container or second path;
adjusting the pitch of the groups of articles; and
placing pitch-adjusted article groups into the containers in the second path.

Tracking, grouping, group pitching and placing are accomplished by means of article grippers mounted and driven by linear motors in a machine direction as components of an EOAT which itself has no vector of movement as a whole in the machine direction. Changes and variations in article grouping, group pitching and group placing in a continuous motion operation are accomplished by the linear motors without any need to adjust the EOAT or change it out. Counterflow of article infeed and of carton conveyance are accommodated.

In an alternative embodiment of the invention, above objectives are accomplished in transfer apparatus and methods where multiple moving elements carrying the individual grippers are independently moved, with respect to the EOAT components moveable only in two axes, and in a machine direction not by the foregoing linear motor apparatus but rather by independently operated and controlled servomotors driving independent element gears along a common rack mounted on and as part of the EOAT. Control, movement and operation of the article grippers are as with the linear motor apparatus in the above embodiment, excepting with independent servomotors in place of the independent linear motors.

Also the invention contemplates the independent movement of gripper carriages in an upstream direction and in a mode where holes in the article line or forming group are detected, then filled, eliminating such prior remedial processes as mentioned above.

These and other objectives and advantages will become readily apparent from the following written description and from the drawings in which:

BRIEF DESCRIPTION OF THE DRAWINGS

FIG. 3 is an isometric view of the EOAT of FIG. 1 with grouped and group pitch adjusted grippers of FIG. 1 in place over a carton conveyor for a first place position;

DETAILED DESCRIPTION OF THE INVENTION

Figure 1:
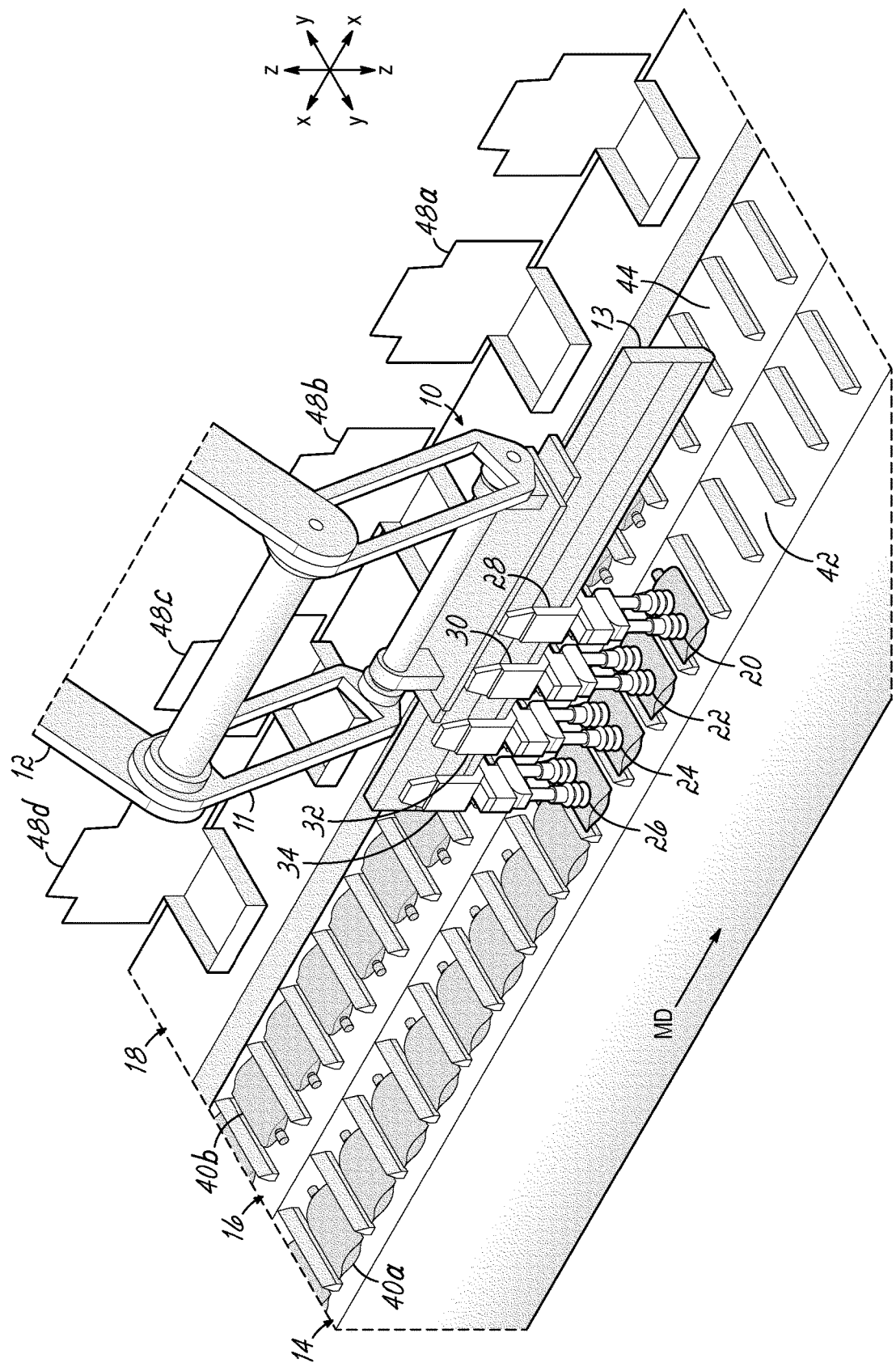
FIG. 1 is an isometric view of an embodiment of the invention illustrating an EOAT carrying article grippers independently driven by linear motors at a first article pick station associated with a first article supply conveyor.

Turning now to the drawings, it will be appreciated that the drawings illustrate but one of the apparatus and methods of the invention for description thereof and that numerous other variations of the invention are readily apparent from this application. For example, while this detailed description illustrates but one EOAT, with four sets of grippers, carried by robotic arms and driven by linear motors, other EOATs may include more or less grippers, gripper groups and associated linear motors.

As used herein, the abbreviated term "EOAT" and its plural form "EOATs" is but an abbreviation for the phrase "End of Arm Tool" or "End of Arm Tooling" and includes the components of the device mounted on an appropriate robot by robot arms for translation thereby or movement in two axes of freedom or motion, that is in the vertical or "Z-axis" direction, up and down with respect to the article supply conveyors and the carton conveyors, and in the horizontal or "Y-axis" direction which is transverse to the machine direction of the supply and carton conveyors in the "X-axis" or machine direction (X).

The EOAT thus itself is moved as a whole only in two directions, vertical and horizontal, by robotic arms, but not in the machine direction.

Carriages and article grippers disclosed herein are components of the EOAT and are in one embodiment driven by linear motors of the EOAT. These carriages and grippers do have a component of motion in the "X-axis" or machine direction MD as described herein. Thus the EOAT as a whole is robotically moved only in two axes, y and z, while the carriages and grippers as described herein are moveable in an x-axis with respect to other components of the EOAT.

Also the terms "containers", "packages" or "cartons" are used interchangeably herein.

Reference is herewith made for disclosure to U.S. Pat. No. 7,134,258, which discloses linear motors driving article carrying trays or carriages independent of each other, in an article conveying path. U.S. Pat. No. 7,134,258 is herewith incorporated herein in its entirety as a part hereof.

It will be appreciated that while U.S. Pat. No. 7,134,258 discloses the application of linear motors to conveyors which move articles in a conveyor path, it does not disclose or suggest use of linear motors in two axis transfer devices which accomplish transferring articles transversely or laterally between two conveyors, whether the conveyors are moving in the same or opposite directions.

There is illustrated in FIGS. 1-8A one embodiment of the invention. With reference to these, there is shown an end-of-arm tool (referred to as an EOAT) 10. EOAT 10 is mounted on lever arms 11, 12 rotationally carried by a robot (not shown). Robot (not shown) and robot arms 11, 12 comprise no part of the invention herein; any suitable robot known in the industry can be used to support and move the EOAT 10 in two axes of motion as described herein.

It will be appreciated that EOAT 10 is carried and driven by robotic arms 11 and 12 only in two axes of motion, vertically (Z-axis) and horizontally (Y-axis) as will be described. EOAT 10 is not moveable as a whole, or entirely, in an X-axis or machine direction.

Further illustrated in the FIGS. 1-8A are two preferably parallel first and second, article supply conveyors 14, 16 and a carton supply conveyor 18, preferably parallel to article supply conveyors 14, 16.

As illustrated, in this embodiment, conveyors 14, 16 and 18 move parallel to and in a machine direction MD; each conveyor 14, 16, 18, preferably driven continuously by any suitable means in direction MD by any conventional means. Elongated member or rail 13 of EOAT 10 moves only with the EOAT 10 in two directions, vertically (Z-axis) and horizontally (Y-axis) over and between the conveyors 14, 16, 18, but not in the machine direction MD (X-axis). Alternately, conveyor 18 could continuously move in a direction opposite to machine direction MD along the X-axis.

EOAT 10 further includes the elongated support member or rail 13 supporting a plurality of gripper sets 20, 22, 24 and 26 carried on respective carriages 28, 30, 32, 34, driven by linear motors.

Figure 13:
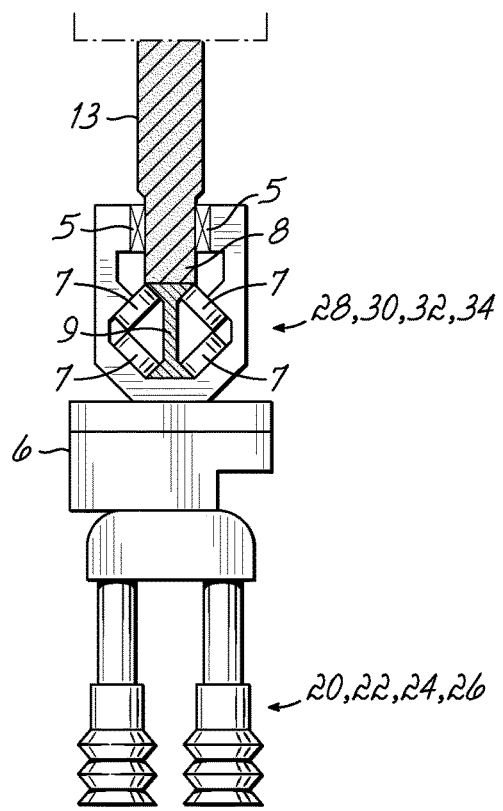
FIG. 13 is a diagrammatic illustration of a linear motor, rail and carriage of the invention of FIGS. 1-8A and 12.

Preferably, rail 13 extends downwardly, is part of EOAT 10 and includes the linear motor coils 8, diagrammatically illustrated in FIG. 13. Carriages 28, 30, 32, 34 are mounted on bearings 7 rolling in rail member 9. Carriages 28, 30, 32, 34 include controllable vacuum manifolds 6. Motor magnets 5 are secured to the carriages as shown in FIG. 13.

The carriages 28-34 and their associated gripper sets 20-26 are carried by rails 13, 9 for reciprocal movement in the machine direction MD with respect to rail 13. However, it will be understood that neither rail element 13, nor lever arms 11, 12, move in the machine direction MD along the X-axis. The entire EOAT 10 is carried by robot arms 11, 12 for movement only in two perpendicular directions or axes, z and y as illustrated by respective vertical and transverse arrows z and y (FIG. 1). Arms 11, 12 do not move in any downstream or upstream direction in any third direction or along X-axis parallel to the machine direction MD.

Carriages 28, 30, 32 and 34, together with associated respective gripper sets 20, 22, 24 and 26, have a component of motion in the third or "x" axis, in or parallel to the machine direction MD, with respect to other components of the EOAT 10, including rails 13, 9.

The carriages herein include respective vacuum transducers or pneumatic programmable manifolds 6 controlling the grippers to engage and convey, or eject, the articles, as described herein for picking, grouping, pitch adjusting and placing articles.

The linear motors, carrying or driving the carriages and associated gripper sets are of any suitable construction and operation as will be described. One form of linear motor useful in the pouch packaging application is the XTS moving magnet linear motor system manufactured by Beckhoff Automation GmbH of Verl, Germany. Other linear motors could be selected, for use in applications for other articles sized and weight. Such motors are programmable by any suitable means to drive the respective gripper sets along rail 13 independently of each other as described below. Thus the entire EOAT 10 is moveable vertically up and down by arms 11, 12 to carry the gripper sets vertically in the Z-axis, and is also moveable transversely in the Y-axis direction to carry the gripper sets transversely across and above the paths of the parallel conveyors 14, 16, 18.

Articles such as pouches 40a, 40b or other items to be packaged are supplied on conveyors 14, 16 in a preferably continuous motion in a downstream direction MD. For illustration, pouches 40a are on conveyor 14 while pouches 40b are on conveyor 16.

Depending on the finally desired packaged product configuration, one or a plurality of pouches 40 may be supplied seriatim on conveyors 14, 16. For clarity, only one pouch 40a, 40b is supplied on conveyors 14, 16 in each pouch tray 42, 44, and at a tray spacing or pitch.

And further in FIG. 1, four pouches 40a are shown being lifted by the gripper sets from conveyor 14, from their initial position.

Cartons such as 48a-48d are carried, preferably continuously in machine direction MD, and at a pitch varying from the tray pitch on conveyors 14, 16. According to the invention the gripper sets 20, 22, 24, 26 are grouped and group pitch adjusted over carton conveyor 18 and cartons 48a-48d as further described. While it is suggested the carton path is in the machine direction MD, it should also be noted that as long as the carton path is parallel to the machine direction, the carton flow may be in the opposite direction of the article infeed.

Accordingly, as the EOAT 10 is moveable up and down and transversely, the gripper sets and carriages on the EOAT 10 are, in addition, moveable in the machine direction MD (X-axis).

Operation

Figure 5:
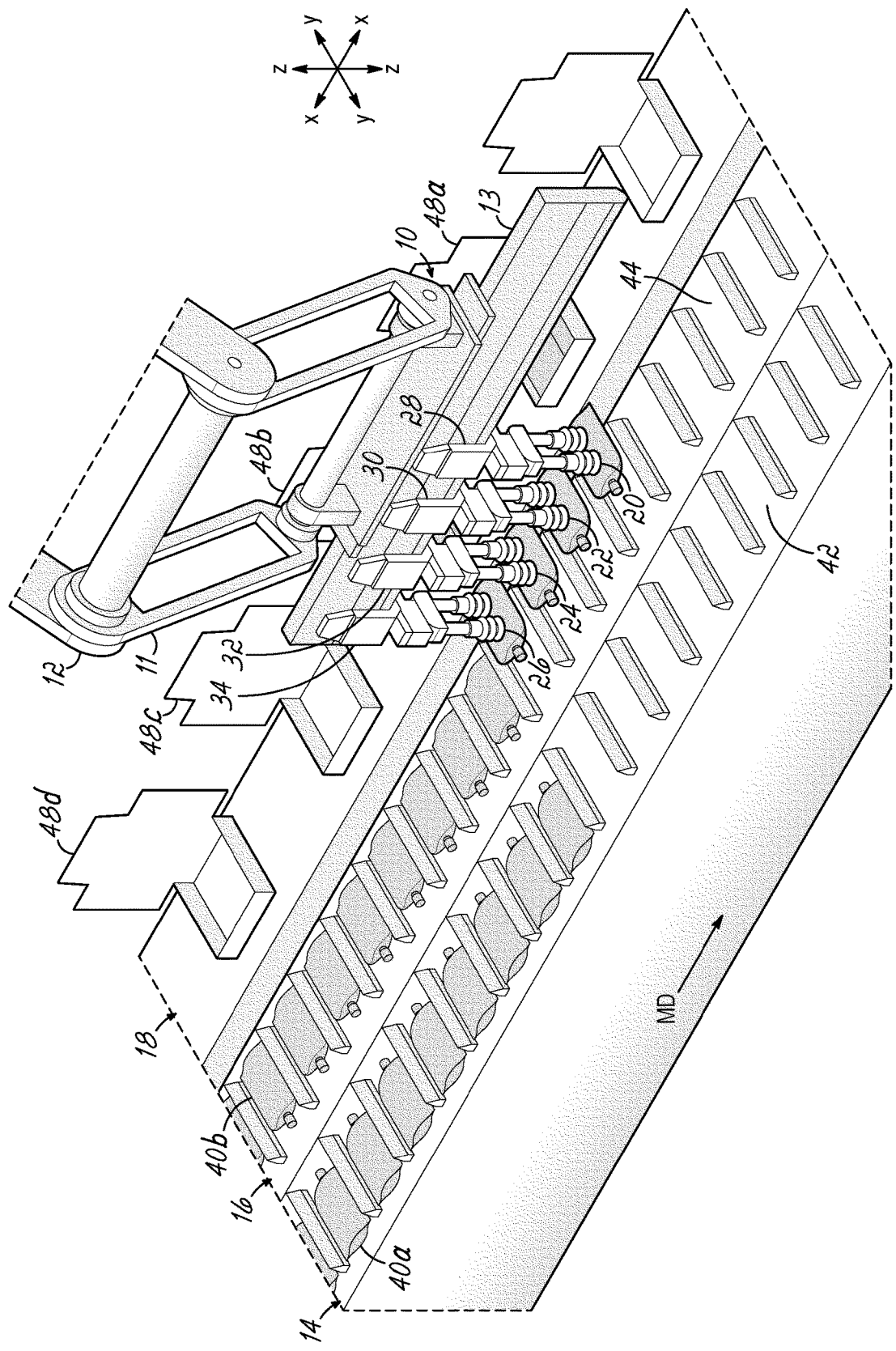
FIG. 5 is an isometric view of the EOAT of FIG. 1 with grippers having picked articles from a second article pick station associated with a second article supply conveyor, and illustrating directional axes x, y and z.

It will be appreciated that the gripper sets 20-26 as in FIG. 1 are typically pitched on an equal pitch (equally spaced apart) in a first pick station 50 (FIG. 2A) over conveyor 14 and as in FIG. 5 on an equal pitch at second pick station 52 (FIG. 5) over conveyor 16 for picking equally spaced articles or pouches 40a, 40b from respective conveyors 14, 16. To accomplish this, the system tracks incoming articles where carriages 28-34 are pitched to match the article pitch and programmed to follow the movement of conveyors 14 and 16. More on this later.

However, once the pouches have been picked from conveyor 14, the carriages and gripper sets as in FIG. 3 have been grouped and pitch adjusted for placing two groups of two articles or pouches 40a each side-by-side from conveyor 14 in two cartons at a first place station 54 (FIG. 4A) at conveyor 18 and as further illustrated in FIG. 3. Carriages and gripper sets are then pitch adjusted for placing groups of two articles or pouches 40b from conveyor 16 in two cartons at a second place station 56 FIG. 8A (and in this embodiment stacked atop pouches 40a from first conveyor 14).

Alternatively, multiple layers and numbers of articles can be placed into containers as desired.

Accordingly, in operation of the invention, equally spaced articles supplied seriatim on both conveyors 14, 16 are picked, grouped, group pitch adjusted and placed, providing filled cartons 48a-48d, in this embodiment of each carton with four articles, with a layer of two articles atop an underlying layer of two articles, and where the pitch or spacing of cartons is different than the pitch of any articles on supply conveyors 14, 16. Individually supplied articles are grouped and the group pitch adjusted to index to sensed or tracked carton spacing or pitch, all without any motion of the entire EOAT 10 in the machine direction MD and while all conveyors 14, 16, 18 move continuously in that direction. Carriages and grippers move in the machine direction, MD, facilitating picking and placing in conjunction with moving conveyors 14, 16 and 18.

More particularly, step-by-step operation of the embodiment shown in the Figures follows.

It will be appreciated that conveyors 14, 16, 18 in this embodiment are arranged parallel to each other, extending in the machine direction, MD, and are preferably but not necessarily continuously driven. Supply conveyors 14, 16 continuously convey articles such as pouches 40a, 40b through respective pouch pick stations 50, 52, while conveyor 18 continuously conveys pouch receiving cartons 48a-48b to and through first and second place stations 54, 56.

The entire EOAT 10 is capable of motion only vertically and also transversely to direction MD. Carriages 28-34 and gripper sets 20-26 of the EOAT 10, however, are moveable, with respect to other EOAT 10 components in the machine direction MD for the particular picking, grouping, group pitch adjusting and placing of pouches 40 as described herein.

The particular operation steps described herein are primarily in two stages, i.e. handling pouches from the first supply conveyor 14, to cartons on conveyor 18, then handing pouches from the second supply conveyor 16 to cartons on conveyor 18.

Figure 2:
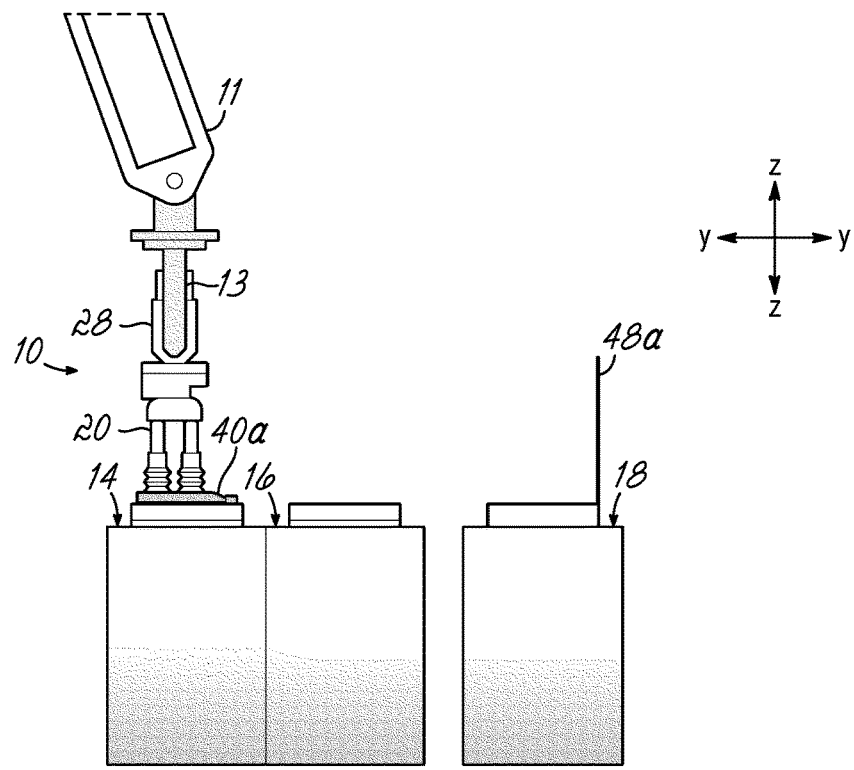
FIG. 2 is an end view taken from a downstream perspective of FIG. 1.
Figure 2A:
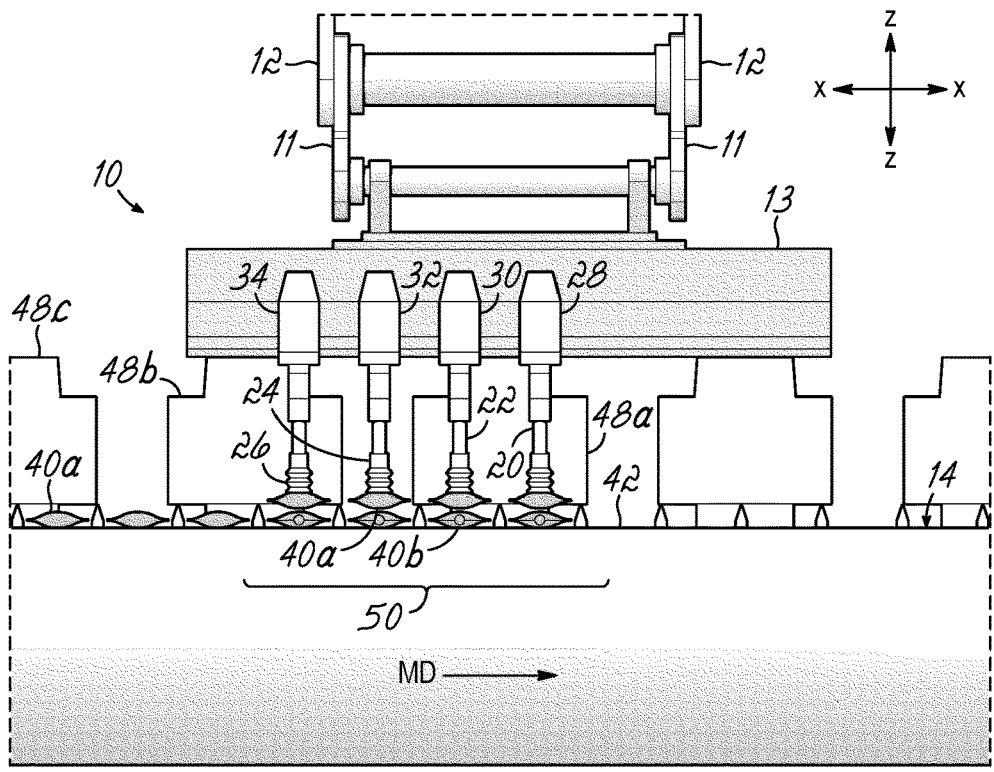
FIG. 2A is a side view of the apparatus of FIG. 2 illustrating the grippers departing the first pick stations.
Figure 4:
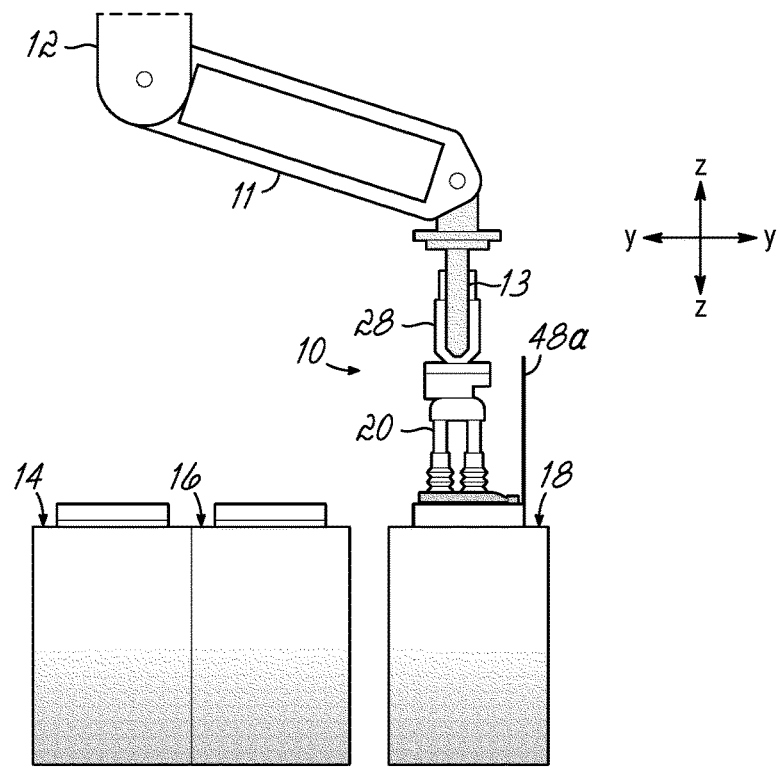
FIG. 4 is an end view taken from a downstream perspective of FIG. 3.
Figure 4A:
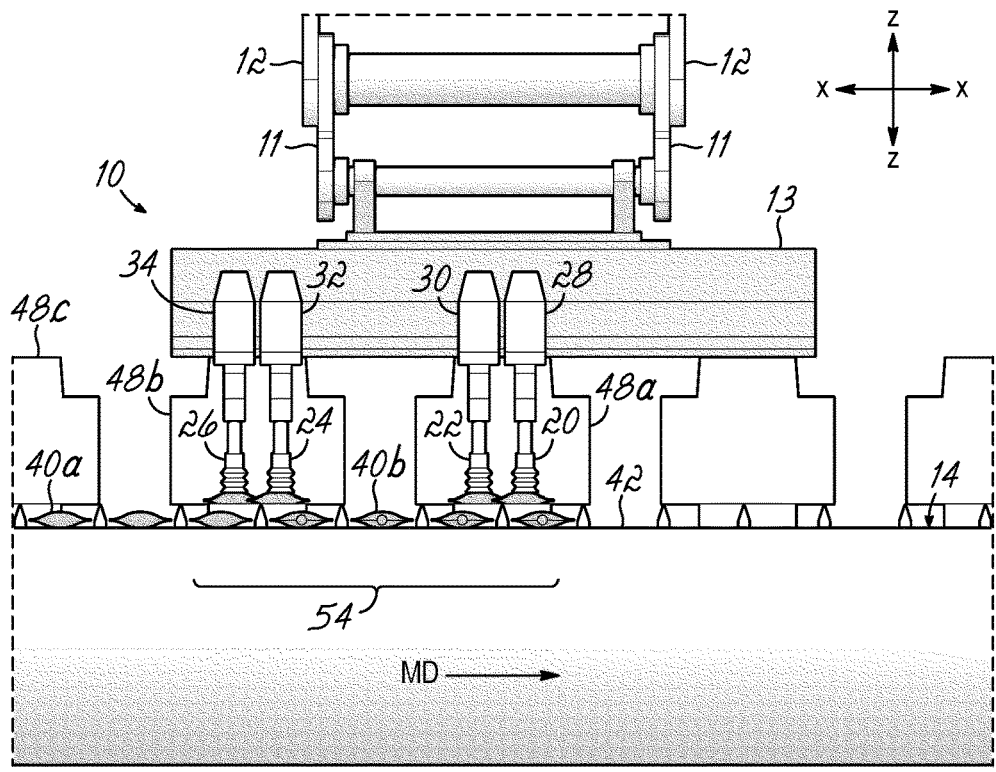
FIG. 4A is a side view of the apparatus of FIG. 4 illustrating the group pitch adjusted grippers over the carton conveyor at a first place station.

First, the control and sensing systems of any suitable manufacture and programming track pouches continuously incoming to a first pick station 50 associated with conveyor 14. Gripper sets 20-26 then move by linear motors to track, then grip four pouches 40a at first pick station 50. Grippers are extended to grasp the four pouches at their respectively tracked pitches and lift them off conveyor 14 (FIGS. 1, 2 and 2A). The carriages 28-34 and their grippers 20-26 are then grouped into two groups such that each group comprises two pouches. The groups are pitch adjusted by the linear motors and carriages, and the EOAT 10 moves them transversely (Y-axis) over carton conveyor 18, where the carton pitch is now matched by the group pitch adjustment of the carriages and grippers. The carton pitch of moving carton conveyor 18 is thus matched and a first group of two pouches is placed into each of two cartons (see FIGS. 3, 4 and 4A) at first place station 54 (FIG. 4A). This results in two partially filled cartons on conveyor 18, at different pitch than pouches on conveyor 14, each carton thus provided with a first layer of two pouches placed therein.

Figure 6:
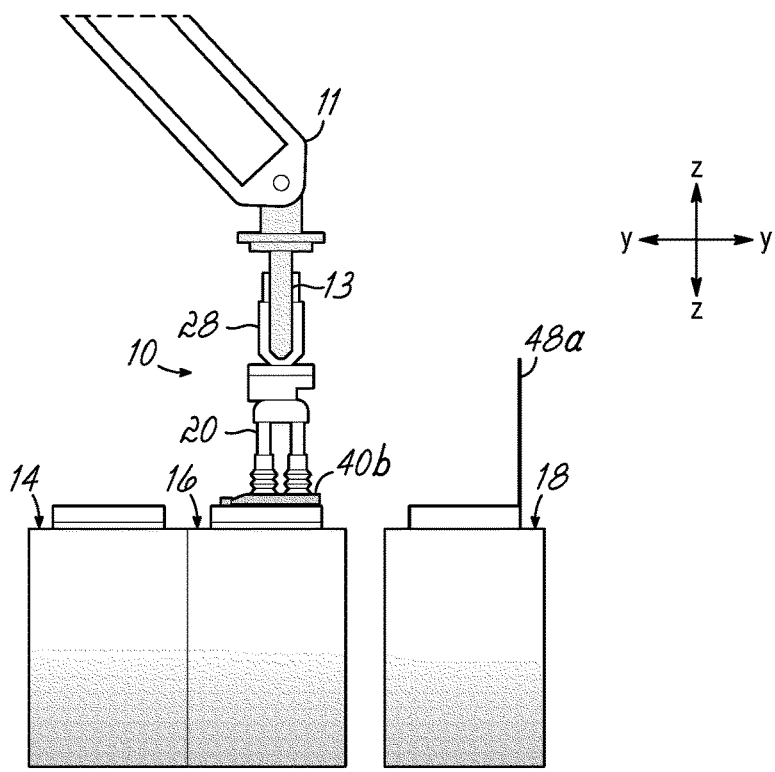
FIG. 6 is an end view taken from a downstream perspective of FIG. 5.
Figure 6A:
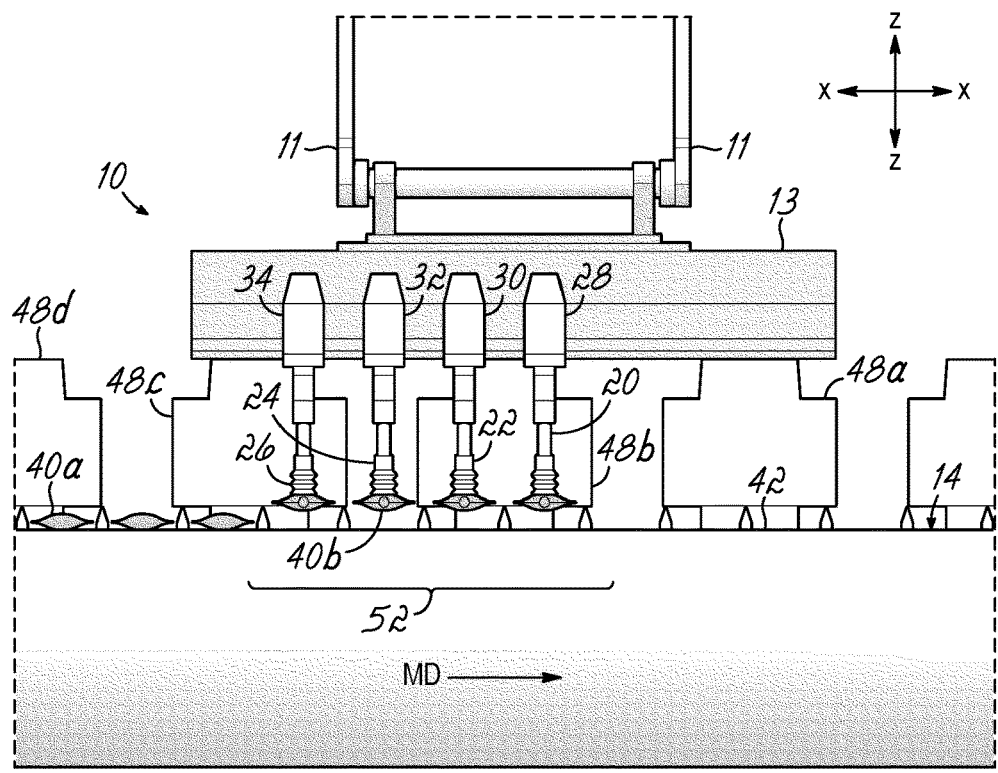
FIG. 6A is a side view of the apparatus of FIG. 6 illustrating the grippers departing a second pick station.
Figure 7:
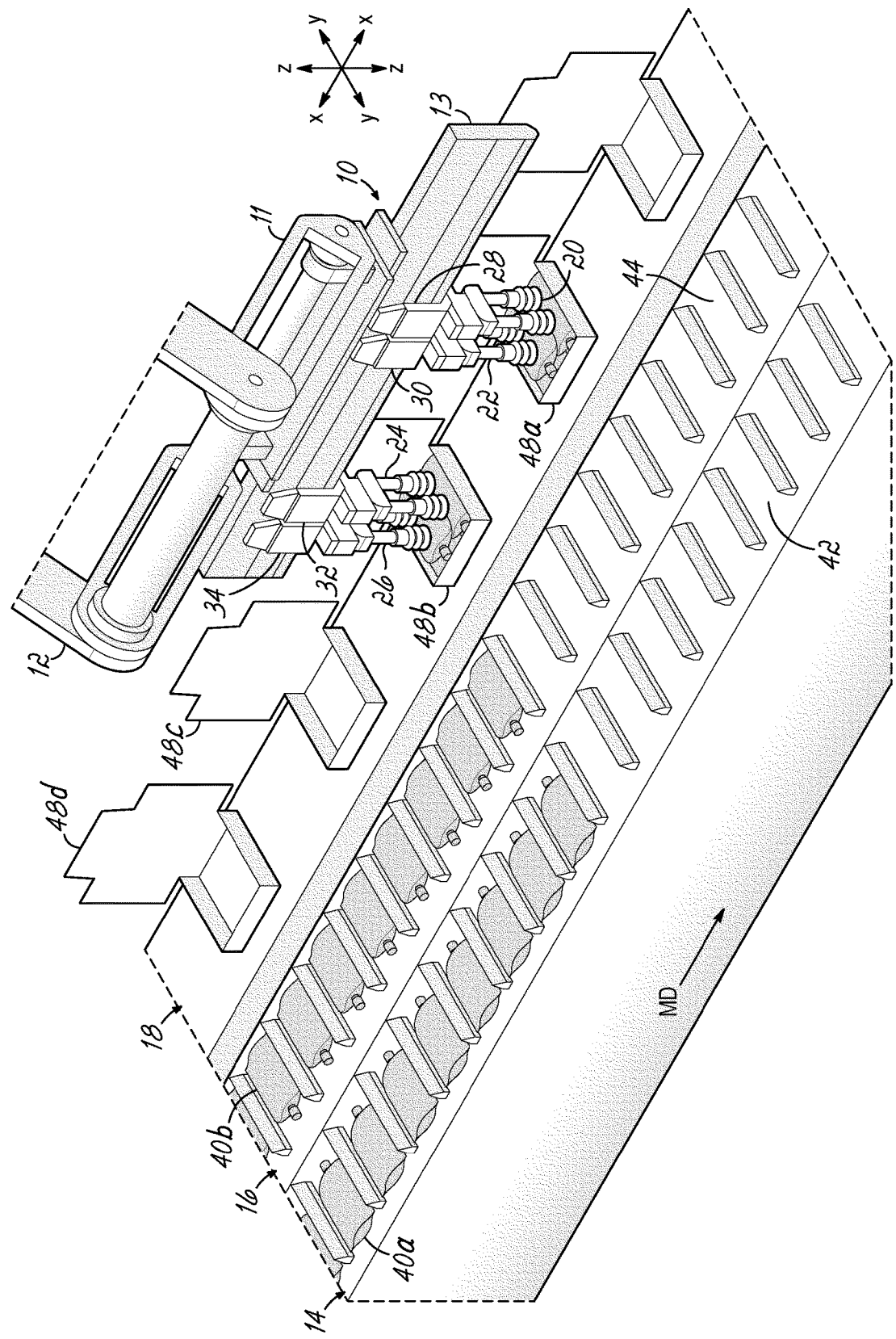
FIG. 7 is an isometric view of the EOAT of FIG. 1 carrying grouped and group pitch adjusted grippers in a second article place station over a carton conveyor for placing articles in cartons with articles from the second article supply conveyor.
Figure 8:
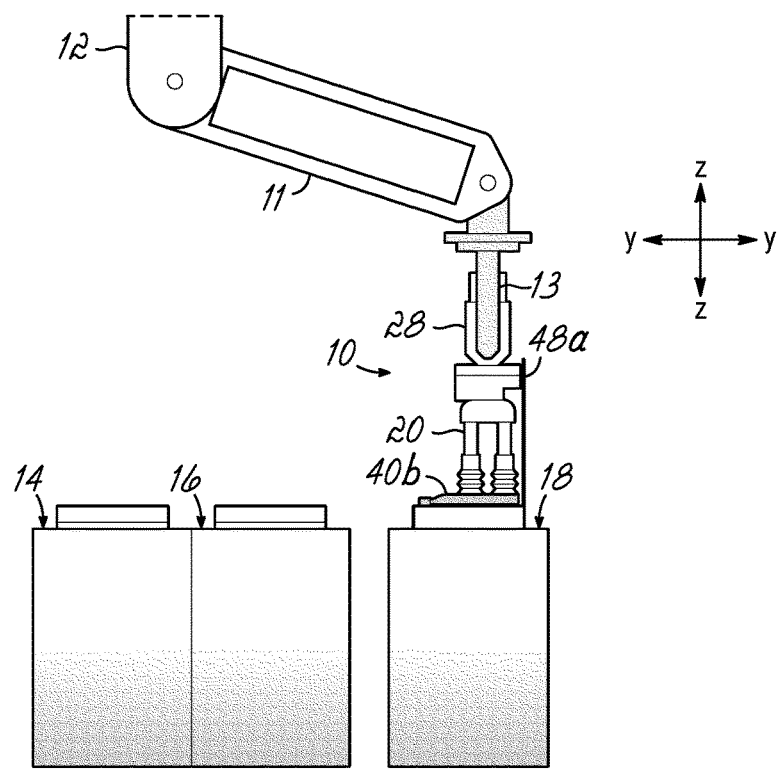
FIG. 8 is an end view taken from a downstream perspective of FIG. 7.
Figure 8A:
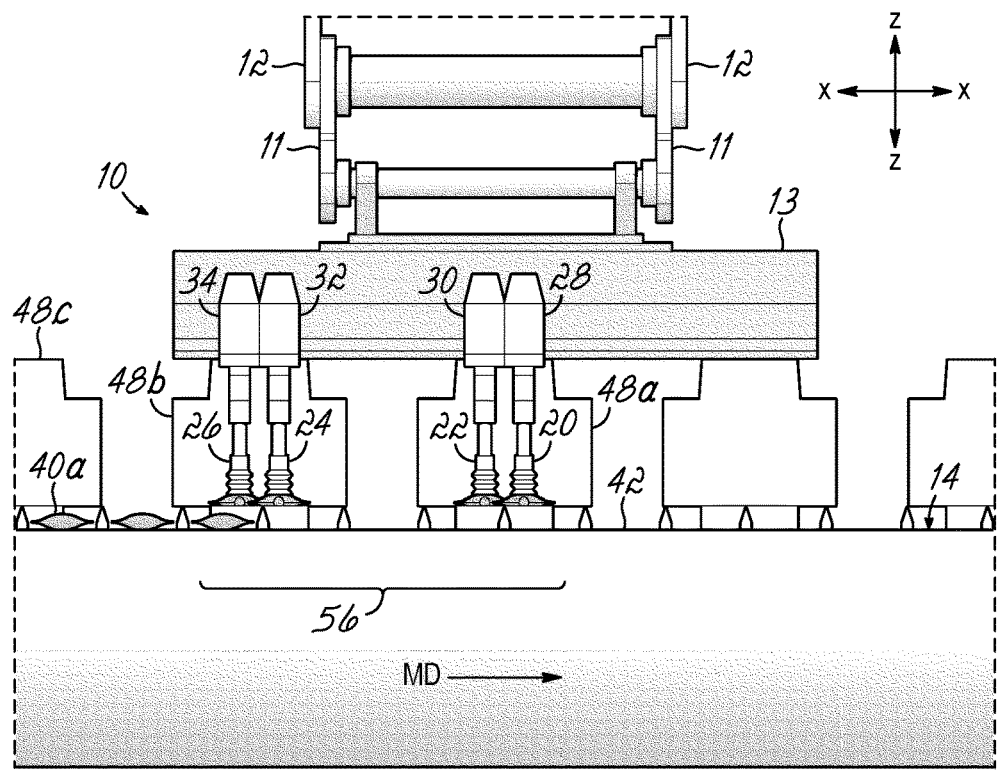
FIG. 8A is a side view of the apparatus of FIG. 8 illustrating the group pitch adjusted grippers of a second place station over the carton conveyor.

At this time, the EOAT 10 is returned transversely (Y-axis) by robotic arms 11, 12 over conveyor 16 where the tracking, picking, grouping, and group pitch adjusting is similarly performed, but with pouches 40b from continuously moving conveyor 16, all as shown in FIGS. 5, 6 and 6A. After the pitch of these pouch groups is adjusted to match the pitch of the tracked cartons, the grippers lower the pouches picked from conveyor 16 into the cartons on conveyor 18 at second place station 56, all while conveyors 14, 16 continuously move to present new pouches to the pick stations 50, 52, all as illustrated in FIGS. 7, 8 and 8A.

In consequence, moving cartons on conveyor 18 in this embodiment are filled with four pouches each, with pouches from both supply conveyors 14, 16, one layer atop another.

In these regards, it will be appreciated that the grippers 20-26 are vertically reciprocal and may be of any suitable means and construction, such as pneumatically or vacuum operated means and suction cups. Many forms and structures of grippers can be used. The term "grippers" is thus herein a generic word to describe how pouches are gripped and held. It could be by means of a vacuum shoe, vacuum cup, gripping jaws, picking needles, magnetic, or any other device to attach, lift and release articles or pouches. Any suitable sensors and linear motor controls can be used to track the moving pouch supply and the moving cartons, to adjust and time the grippers to index them over the supplied pouches, then lower them over and lift the supplied pouches, then group and group pitch adjust and place them, via any suitable linear motors, into the moving cartons on conveyor 18.

And in yet a further aspect of the invention, applicable to the foregoing embodiments, gripper sets 110-115 are carried on separate carriages independently driven not by linear motors, but by separate servo motors 130-135, for example. These motors each drive a gear 140-145 operably disposed along an extended rack 150 comprising part of EOAT 100. When the motors 130-135 turn their respective gear 140-145, the carriage associated with the motor is moved along the rack 150 in a machine direction or x-axis, much as the carriages driven by the linear motors of the above embodiment.

Apart from these differences, sensing, control, function and result are otherwise the same as the foregoing embodiment as described above.

Figure 9:
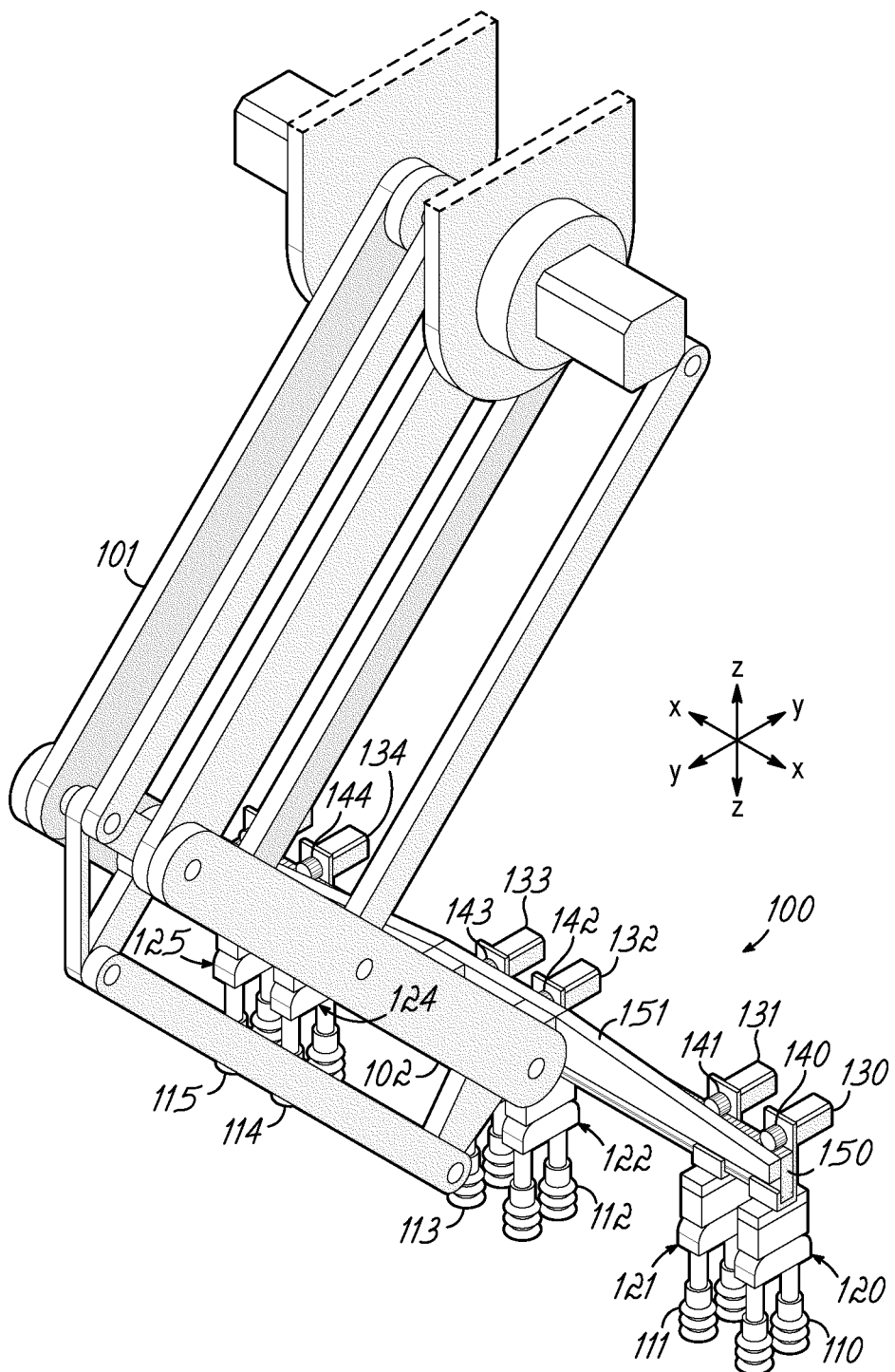
FIG. 9 is an isometric view of an alternate embodiment of the invention illustrating an EOAT including a plurality of article grippers driven by servo motors.
Figure 10:
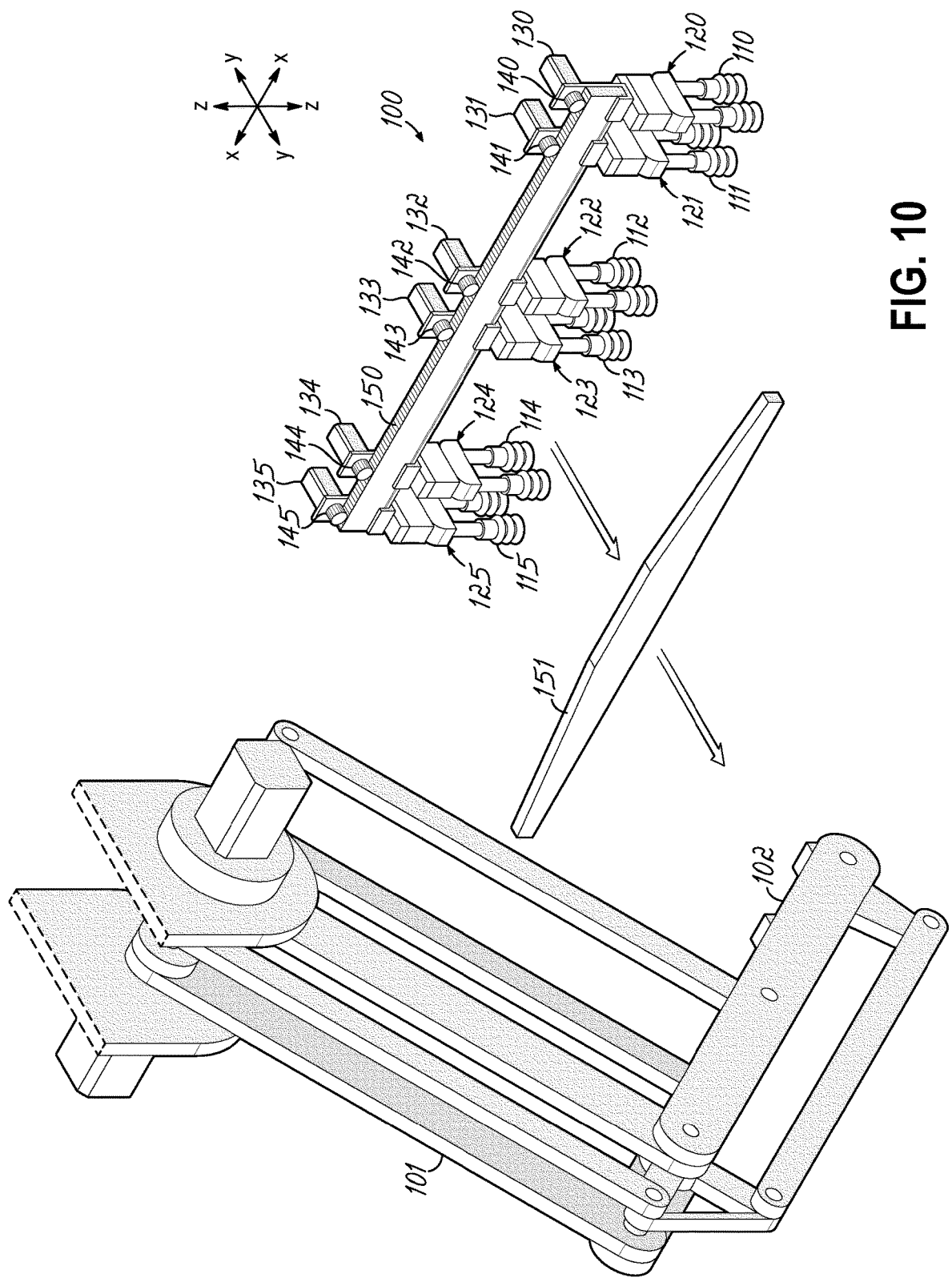
FIG. 10 is an expanded view of the alternate embodiment as in FIG. 9.

With more particularity, FIGS. 9 and 10 illustrate an EOAT 100 on which are mounted six gripper sets 110-115, each set having two preferably pneumatic article grippers, as disclosed above. Each two gripper set of two individual grippers are carried on a respective carriage 120-125 with each carriage driven by a respective servo motor 130-135 as shown. Each motor independently drives a respective drive gear 140-145. Each gear 140-145 is mounted in operative engagement with an elongated toothed rack 150. Rack 150 comprises part of an EOAT 100 such as the EOAT 10 of the foregoing embodiment and of any suitable construction. Rack 150 is secured to EOAT 100 by suitable brackets 151, also part of EOAT 100.

In respect of this invention, EOAT 100 is carried on robotic arms 101, 102 and is moveable vertically in a Z-axis and horizontally in a Y-axis but not in a machine direction along an X-axis as indicated in FIGS. 9 and 10, similarly to EOAT 10 of FIGS. 1-8A.

It will be appreciated that EOAT 100 is mounted above article supply conveyors such as conveyors 14, 16 and container conveyor 18 of FIGS. 1-8A in similar fashion thereto.

Thus each element set 110-115 of two grippers, and respective carriages 120-125 are driven along rack 150 by a respective servo motor 130-135, and independently of the other motors and carriages, and in an X-axis or machine direction preferably parallel to article supply and container conveyors as in FIGS. 1-8A.

Also, it is noted that while FIGS. 1-8A show four carriages 28, 30, 32 and 34, shown in this embodiment are six carriages 120-125. Two additional carriages may be used for higher rates or carton volumes, or the upstream-most carriages for traveling upstream, the return to fill in "holes" or missing articles as described.

In this embodiment servo motors are controlled similarly to the linear motor drives of the preceding embodiment for the same functions. Here, however, the carriages carrying the grippers are driven not by independent linear motors, but by independent servo motors, controlled to the same ends by any suitable control sensing and registration functions readily apparent to any person of ordinary skill having this disclosure.

As in the embodiment of FIGS. 1-8A, the carriages are moveable along in an x-direction with the EOAT 100 not entirely moveable in that direction as a whole, thus achieving the functions and benefits of the foregoing embodiment.

Further the invention contemplates the foregoing apparatus in the embodiments above used to cure missing articles and provide "hole healing", a term used herein to describe an absence or void in a formed group of articles. For a variety of reasons, a formed group of articles in a packaging system may be less than a full complement of articles. For example only, an intended group of four articles may only contain two or three, or an intended group of eight articles may only contain six or seven. Thus a "hole" exists where one or more articles are missing in a formed group in a container.

The invention contemplates hole healing, or filling out of an incomplete article group where the line-up of incoming articles is not consistent, such as where articles are not on a constant pitch but there are "holes", or vacancies, in the incoming article stream. Despite such aberrations a final article pattern with no article vacancies is desired for packaging or transfer. According to the invention this is accomplished by independently moving one or more of the article gripper sets, described above, to a position upstream any gap in the incoming article stream. These grippers pick one or more upstream articles then orient a full complement of articles to proper placement in a complete formed group for transfer, The full group is then transferred to and placed into a container, at a different pitch, with a full complement or "pattern" of articles in that prior formed group. It will be thus appreciated that this hole healing operation is preferably carried out while all the articles for the group are being picked from the article supply conveyors.

Figure 11:
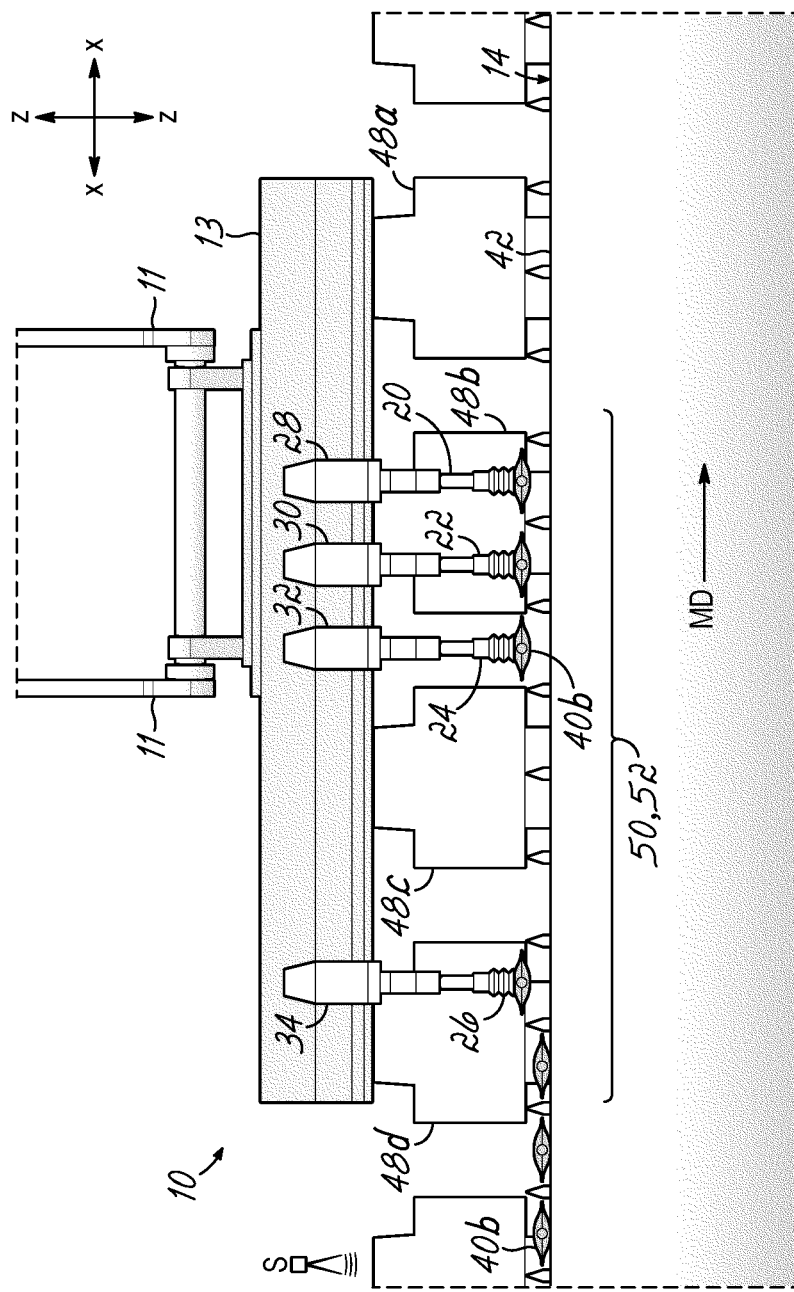
FIG. 11 is an elevational view of a preferred embodiment of the invention of FIGS. 1-8A illustrating the "hole healing" function thereof.

Thus an upstream gripper carriage can be moved to a succeeding article upstream of a "hole" then group that succeeding article in the group forming by the downstream gripper carriages. Moreover, and referring to the embodiment of FIGS. 1-8A and FIG. 11, with support member on rail 13 sufficiently sized in length, carriage members 28, 30, 32, 34 can be programmed to travel upstream to be registered with the incoming product stream and avoid portions of the product stream where no product is present. FIG. 11 illustrates a side elevational view where carriage 34 has been programmed to move upstream to avoid 3 consecutive holes (for example) in the product stream sensed by a sensor S as the article supply conveyor moves downstream. It would be understood that support member 13 could be sized to extend pick areas 50 and 52 to accommodate all possible missing product scenarios within the limits of the desired package pattern and available space in the machine. Holes occurring likely equate to a change in input rate and will result in temporary adjustment to the rate of downstream operations.

The ability to move the carriages upstream from the normal pickpoints or station accommodates hole healing.

And where hole healing occurs, downstream processing or packaging rates can be reduced to accommodate the additional time required, then returned to normal. Constant motion can be retained without resulting to intermittent motion.

While FIG. 11 illustrates the hole healing function in terms of the embodiment of FIGS. 1-8a, similar hole healing can be accomplished in a similar way in the alternate embodiment of FIGS. 9 and 10.

Group rejection, waste, delay, cost, etc. attending prior solutions are thus avoided.

Figure 12:
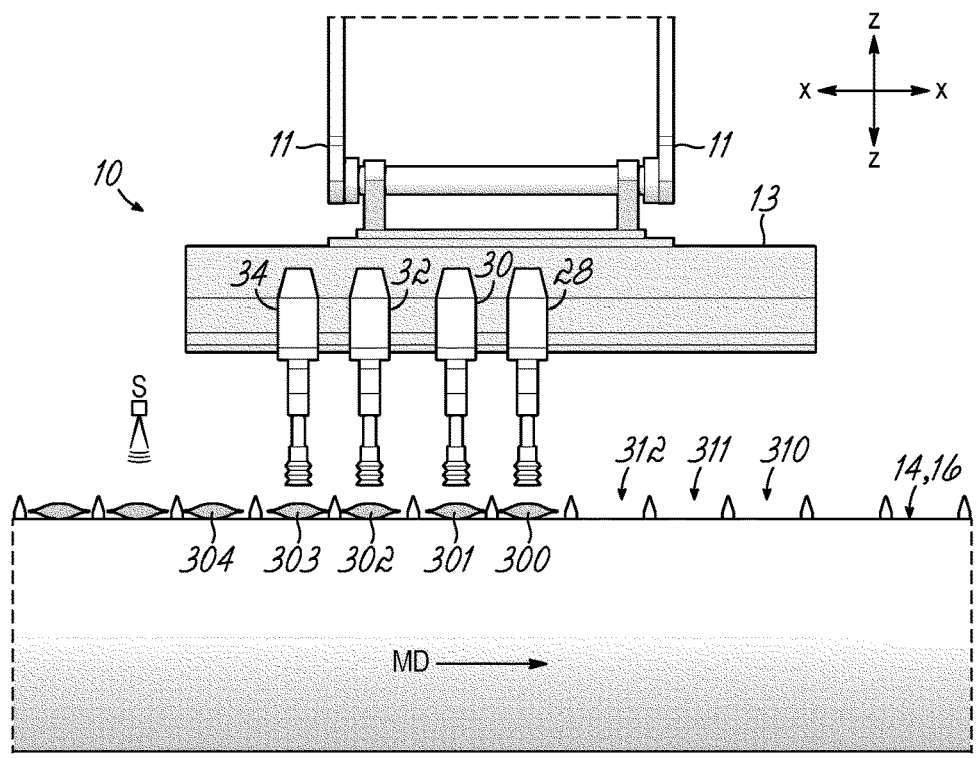
FIG. 12 is an elevational view of a preferred embodiment of the invention of FIGS. 1-8A, illustrating the article positional registration function of the invention.

Finally FIG. 12 illustrates the upstream product registration to provide accurate product position and orientation when picked by the grippers. FIG. 12 illustrates potential incoming product position in trays or between lugs where articles are randomly disposed with reference to positions not repeatedly exacting. Thus it should be noted that with the ability to independently move each of the carriages, the carriages can be registered to the position of each incoming article. It is often found that the positional accuracy of arriving product can vary somewhat and the need to correct this variation is important to the downstream processes. Again with reference to the preferred embodiment of FIGS. 1-8A, FIG. 12 shows incoming product varying in position and the carriages 28, 30, 32, 34 located in the machine direction relative to the product. A sensor of any suitable type is placed upstream at a suitable position to sense arriving articles, such as articles 300, 301, 302, 303, 304. The sensor provides information on the location of the incoming articles to the registration function which in turn defines corrections to the pick locations of the individual carriages as illustrated in FIG. 12.

Of course similar operations can be accomplished by the alternate embodiment of FIGS. 9 and 10.

Thus in other words or detail the described embodiments contemplate independent movement of the gripper carriages, programmed to register the location of the incoming product on the article supply conveyor. An upstream sensor senses product location (or absence) and provides input to a registration function within a controller for the carriages, a registration function provides adjustments to the "pick" locations and the controller prescribes corrections to the motion profiles of the independent carriages to accurately locate articles at pick points.

It will be appreciated that many variations of the invention as described are contemplated by the invention, including variation in the number of pouch supply and carton conveyors, their positional relationship, the number of groups, the number of pouches in a group, the number and orientation of pouches placed in a carton, the selection of the order of picking from respective supply conveyors, varied grouping in cartons for custom orders, article and carton counterflow and many other configurations and methods. While continuously moving supply and carton conveyors are preferred, the invention provides the article handing for enhanced throughput in this way, and including the provision of grippers driven by linear motors on the EOAT for product transfer enabling a large variety of structures and operational methods for packaging not heretofore contemplated.

It will also be appreciated that any form of registration function and controller protocols can be made and programmed by those of skill in that art, having and following the direction and disclosure provided herein.

Also the invention can be applied to perform article transfer between the article supply and container conveyors at different machine directions with a controllable EOAT but still not wholly moving in a machine direction.

Moreover, the invention is useful in both continuous and intermittent article and control container operations, although continuous motion processes are preferable.

These and other alternatives and embodiments will be readily apparent to those of skill in the art without departing from the scope of this invention and applicant intends to be bound only by the claims appended hereto.

What is claimed is:

1. Transfer apparatus for transferring incoming articles at one pitch on an article supply conveyor and in groups to containers on another conveyor at a different pitch, and comprising:
    at least one article supply conveyor conveying articles at one pitch in a machine direction;
    at least one container conveyor conveying containers at another pitch in one direction;
    an end-of-arm tool moveable operationally between said conveyors but not itself moveable in said machine direction;
    article grippers that are carried by respective carriages directly mounted on an elongated member of said end-of-arm tool for movement there along, wherein said article grippers move independently with respect to each other and move in said machine direction, and wherein said elongated member is immoveable in said end-of-arm tool in said machine direction; and
    linear motors driving said grippers independently along said end-of-arm tool in said machine direction at said one pitch for picking the articles from said article supply conveyor, and advancing pitch adjusted article groups for placement in containers at said other pitch on said container conveyor.

2. Transfer apparatus as in claim 1 wherein said one direction is in said machine direction.

3. Transfer apparatus as in claim 1 wherein said one direction is opposite to said machine direction.

4. Transferring apparatus as in claim 1 including at least two article supply conveyors, said grippers transferring said articles to said containers in pitch adjusted groups of articles comprising articles from each article supply conveyor.

5. Transferring apparatus as in claim 1 wherein said grippers are drivable in a direction opposite to said machine direction.

6. Transfer apparatus as in claim 1 wherein said grippers are moveable in a direction opposite said machine direction for picking a following article from said article supply conveyor, and then moveable in a machine direction for adding said following article to a forming group.

7. Transfer apparatus as in claim 1 wherein said article supply conveyor and said container conveyor are continuously moveable.

8. Transfer apparatus as in claim 1 wherein said article supply conveyor and said container conveyor are intermittently moveable.

9. Transfer apparatus as in claim 1 wherein one of said article supply conveyor and said container conveyor is continuously moveable while the other is intermittently moveable.

10. Transfer apparatus for transferring incoming articles at one pitch on an article supply conveyor and in groups to containers on another conveyor at a different pitch, and comprising:
    at least one article supply conveyor conveying articles at one pitch in a machine direction;
    at least one container conveyor conveying containers at another pitch in one direction;
    an end-of-arm tool moveable operationally between said conveyors but not itself moveable in said machine direction;
    article grippers that are carried by respective carriages directly mounted on an elongated member of said end-of-arm tool for movement there along, wherein said article grippers move independently with respect to each other and move in said machine direction, and wherein said elongated member is immoveable in said end-of-arm-tooling in said machine direction; and
    servo motors driving said grippers independently along said end-of-arm tool in said machine direction at said one pitch for picking the articles from said article supply conveyor, and advancing pitch adjusted article groups for placement in containers at said other pitch on said container conveyor.

11. Transfer apparatus as in claim 10 wherein said one direction is in said machine direction.

12. Transfer apparatus as in claim 10 wherein said one direction is opposite to said machine direction.

13. Transferring apparatus as in claim 10 including at least two article supply conveyors, said grippers transferring said articles to said containers in pitch adjusted groups of articles comprising articles from each article supply conveyor.

14. Transferring apparatus as in claim 10 further including an elongated rack on said end-of-arm tool and a rotary gear driven by each servo motor in cooperation with said rack for independently moving said grippers when said servo motors rotate said gears.

15. Transfer apparatus as in claim 10 wherein said servo motors drive said grippers independently in an upstream direction opposite said machine direction in said one pitch for picking a following article from said article supply conveyor and then in a machine direction for adding said following article to a forming group.

16. Transfer apparatus as in claim 10 wherein said article supply conveyor and said container conveyor are continuously moveable.

17. Transfer apparatus as in claim 10 wherein said article supply conveyor and said container conveyor are intermittently moveable.

18. Transfer apparatus as in claim 10 wherein one of said article supply conveyor and said container conveyor is continuously moveable while the other is intermittently moveable.

* * * * *

UNITED STATES PATENT AND TRADEMARK OFFICE
CERTIFICATE OF CORRECTION

PATENT NO. : 11,724,843 B2
APPLICATION NO. : 17/227731
DATED : August 15, 2023
INVENTOR(S) : Kalany et al.

Page 1 of 1

It is certified that error appears in the above-identified patent and that said Letters Patent is hereby corrected as shown below:

On the Title Page

In Column 2, Other Publications, Line 2, change "Issue in Corresponding International Application" to --Issued in Corresponding International Application--.

In the Specification

In Column 1, Lines 23-24, change "such as a cartons whose pitch is matched to the pitch adjusted article" to --such as a carton whose pitch is matched to the pitch adjusted article--.

In Column 2, Lines 26-27, change "reduction of throughput rate, additional apparatus, personal cost or the like." to --reduction of throughput rate, additional apparatus, personnel cost or the like.--.

In Column 6, Lines 31-32, change "for use in applications for other articles sized and weight." to --for use in applications for other article sizes and weights.--.

In Column 7, Lines 59-60, change "then handing pouches from the second supply conveyor 16 to cartons" to --then handling pouches from the second supply conveyor 16 to cartons--.

In Column 8, Lines 62-63, change "Each two gripper set of two individual grippers are carried on a respective carriage" to --Each two gripper set of two individual grippers is carried on a respective carriage--.

In the Claims

Claim 10, Column 12, Lines 30-31, change "wherein said elongated member is immoveable in said end-of-arm-tooling in said machine direction; and" to --wherein said elongated member is immoveable in said end-of-arm-tool in said machine direction; and--.

Signed and Sealed this
Twenty-sixth Day of September, 2023

Katherine Kelly Vidal
*Director of the United States Patent and Trademark Office*